US012241380B2

(12) United States Patent
Lutjen et al.

(10) Patent No.: US 12,241,380 B2
(45) Date of Patent: Mar. 4, 2025

(54) BOLTED JOINT OF GAS TURBINE ENGINE

(71) Applicant: RTX Corporation, Farmington, CT (US)

(72) Inventors: Paul M. Lutjen, Kennebunkport, ME (US); Dairus D. McDowell, Springvale, ME (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/181,149

(22) Filed: Mar. 9, 2023

(65) Prior Publication Data

US 2024/0301805 A1 Sep. 12, 2024

(51) Int. Cl.
*F01D 25/24* (2006.01)
*F01D 9/02* (2006.01)

(52) U.S. Cl.
CPC ........... *F01D 25/243* (2013.01); *F01D 9/023* (2013.01); *F05D 2240/40* (2013.01); *F05D 2260/36* (2013.01)

(58) Field of Classification Search
CPC ...... F01D 25/243; F01D 25/246; F01D 25/28; F01D 9/023; F05D 2240/35; F05D 2240/40; F05D 2240/90; F05D 2260/31; F05D 2260/36; F05D 2230/642; F05D 2230/644; F23R 3/002; F23R 3/50; F23R 3/60; F05B 2230/606; F02C 3/14; F02C 7/20
See application file for complete search history.

(56) References Cited

U.S. PATENT DOCUMENTS

| | | | |
|---|---|---|---|
| 6,895,761 | B2 | 5/2005 | Mitchell et al. |
| 8,997,501 | B2 | 4/2015 | Cihlar et al. |
| 10,507,904 | B2 | 12/2019 | Scott |

(Continued)

FOREIGN PATENT DOCUMENTS

| | | | |
|---|---|---|---|
| CN | 102808697 | A | 12/2012 |
| EP | 3760835 | A1 | 1/2021 |
| WO | 2014051690 | A1 | 4/2014 |

OTHER PUBLICATIONS

Extended European Search Report for EP Application No. 24151025.4; Issue Date, Jul. 30, 2024.

*Primary Examiner* — Loren C Edwards
(74) *Attorney, Agent, or Firm* — CANTOR COLBURN LLP

(57) ABSTRACT

A component of a gas turbine engine includes a continuous hoop portion extending at least partially around an engine central longitudinal axis of the gas turbine engine and a bolting feature extending from the hoop portion, configured for securing the component to an adjacent component. The bolting feature includes a circumferential arm extending radially and circumferentially from the hoop portion. The circumferential arm defines a radial gap between the circumferential arm and the hoop portion. The circumferential arm includes a bolt opening for installation of a bolt therethrough. A connecting leg extends radially from the hoop portion across the radial gap toward the connecting arm. An arm interlocking feature is located at the circumferential arm and is configured to radially interlock with a complementary leg interlocking feature of the connecting leg. The arm interlocking feature and the leg interlocking feature have a radial interconnect gap therebetween in a free state.

17 Claims, 3 Drawing Sheets

(56) References Cited

U.S. PATENT DOCUMENTS

| | | | | |
|---|---|---|---|---|
| 11,280,295 | B2 | 3/2022 | Alloway et al. | |
| 2006/0010879 | A1 * | 1/2006 | Aumont | F23R 3/60 60/752 |
| 2009/0188258 | A1 * | 7/2009 | Rizkalla | F01D 9/023 60/800 |

* cited by examiner

BOLTED JOINT OF GAS TURBINE ENGINE

STATEMENT OF FEDERAL SUPPORT

This invention was made with Government support under Contract N00019-23-F-0019 awarded by the United States Navy. The Government has certain rights in the invention.

BACKGROUND

Exemplary embodiments of the present disclosure pertain to the art of gas turbine engines. More particularly, the present disclosure relates to bolted joints between components of a gas turbine engine.

Gas turbine engines include many bolted joints defining axial connections between rotationally stationary components, such as cases, combustors, turbine vanes or the like. The bolts typically extend through flanges which extend radially from a full hoop structure of the components. There are instances in such bolted joint structures, however, in which there is an axial interference or an axial thermal mismatch between the components. This induces an axil load prying open the flanges. Additionally, in some instances there is a mismatch in thermal growth between the components.

BRIEF DESCRIPTION

In one embodiment, a component of a gas turbine engine includes a continuous hoop portion extending at least partially around an engine central longitudinal axis of the gas turbine engine and a bolting feature extending from the hoop portion. The bolting feature is configured for securing the component to an adjacent component. The bolting feature includes a circumferential arm extending radially and circumferentially from the hoop portion. The circumferential arm defines a radial gap between the circumferential arm and the hoop portion. The circumferential arm includes a bolt opening for installation of a bolt therethrough. A connecting leg extends radially from the hoop portion across the radial gap toward the connecting arm. An arm interlocking feature is located at the circumferential arm and is configured to radially interlock with a complementary leg interlocking feature of the connecting leg. The arm interlocking feature and the leg interlocking feature have a radial interconnect gap therebetween in a free state.

Additionally or alternatively, in this or other embodiments the arm interlocking feature and the leg interlocking feature define one of a hook configuration, a dovetail configuration or a fir tree configuration.

Additionally or alternatively, in this or other embodiments the circumferential arm is located radially inboard of the hoop portion.

Additionally or alternatively, in this or other embodiments the circumferential arm includes an arm base connecting to the hoop portion and a bolting portion including the bolt opening. The arm base is located at a first circumferential location and the bolt opening is located at a second circumferential location different from the first circumferential location.

Additionally or alternatively, in this or other embodiments the arm interlocking feature is located at the bolting portion.

Additionally or alternatively, in this or other embodiments the radial interconnect gap is formed by electrical discharge machining.

Additionally or alternatively, in this or other embodiments the radial interconnect gap is at a non-zero angle relative to the engine central longitudinal axis.

In another embodiment, a bolted joint assembly of a gas turbine engine includes a first component extending at least partially around an engine central longitudinal axis and a second component extending at least partially around the engine central longitudinal axis. A plurality of bolts connect the first component to the second component. At least one of the first component or the second component includes a continuous hoop portion extending at least partially around the engine central longitudinal axis and a bolting feature extending from the hoop portion. The bolting feature is configured for securing the first component to the second component. The bolting feature includes a circumferential arm extending radially and circumferentially from the hoop portion. The circumferential arm defines a radial gap between the circumferential arm and the hoop portion. The circumferential arm includes a bolt opening for installation of a bolt of the plurality of bolts therethrough. A connecting leg extends radially from the hoop portion across the radial gap toward the connecting arm. An arm interlocking feature is located at the circumferential arm configured to radially interlock with a complementary leg interlocking feature of the connecting leg. The arm interlocking feature and the leg interlocking feature have a radial interconnect gap therebetween in a free state.

Additionally or alternatively, in this or other embodiments the arm interlocking feature and the leg interlocking feature define one of a hook configuration, a dovetail configuration or a fir tree configuration.

Additionally or alternatively, in this or other embodiments the circumferential arm is located radially inboard of the hoop portion.

Additionally or alternatively, in this or other embodiments the circumferential arm includes an arm base connecting to the hoop portion and a bolting portion including the bolt opening. The arm base is located at a first circumferential location and the bolt opening is located at a second circumferential location different from the first circumferential location.

Additionally or alternatively, in this or other embodiments the arm interlocking feature is located at the bolting portion.

Additionally or alternatively, in this or other embodiments the radial interconnect gap is formed by electrical discharge machining.

Additionally or alternatively, in this or other embodiments the radial interconnect gap is at a non-zero angle relative to the engine central longitudinal axis.

In yet another embodiment, a gas turbine engine includes a combustor, a turbine section, and a bolted joint assembly securing the combustor to the turbine section. The bolted joint assembly includes a first component of the combustor extending at least partially around an engine central longitudinal axis, and a second component of the turbine section extending at least partially around the engine central longitudinal axis. A plurality of bolts connect the first component to the second component. At least one of the first component or the second component includes a continuous hoop portion extending at least partially around the engine central longitudinal axis and a bolting feature extending from the hoop portion. The bolting feature is configured for securing the first component to the second component. The bolting feature includes a circumferential arm extending radially and circumferentially from the hoop portion. The circumferential arm defines a radial gap between the circumferential arm and the hoop portion. The circumferential arm includes a bolt opening for installation of a bolt of the plurality of bolts therethrough. A connecting leg extends radially from the hoop portion across the radial gap toward the connecting arm. An arm interlocking feature located at the circumferential arm is configured to radially interlock with complementary leg interlocking feature of the connecting leg. The arm interlocking feature and the leg interlocking feature have a radial interconnect gap therebetween in a free state.

Additionally or alternatively, in this or other embodiments the arm interlocking feature and the leg interlocking feature define one of a hook configuration, a dovetail configuration or a fir tree configuration.

Additionally or alternatively, in this or other embodiments the circumferential arm is located radially inboard of the hoop portion.

Additionally or alternatively, in this or other embodiments the circumferential arm includes an arm base connecting to the hoop portion and a bolting portion including the bolt opening. The arm base is located at a first circumferential location and the bolt opening is located at a second circumferential location different from the first circumferential location.

Additionally or alternatively, in this or other embodiments the arm interlocking feature is located at the bolting portion.

Additionally or alternatively, in this or other embodiments the radial interconnect gap is at a non-zero angle relative to the engine central longitudinal axis.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
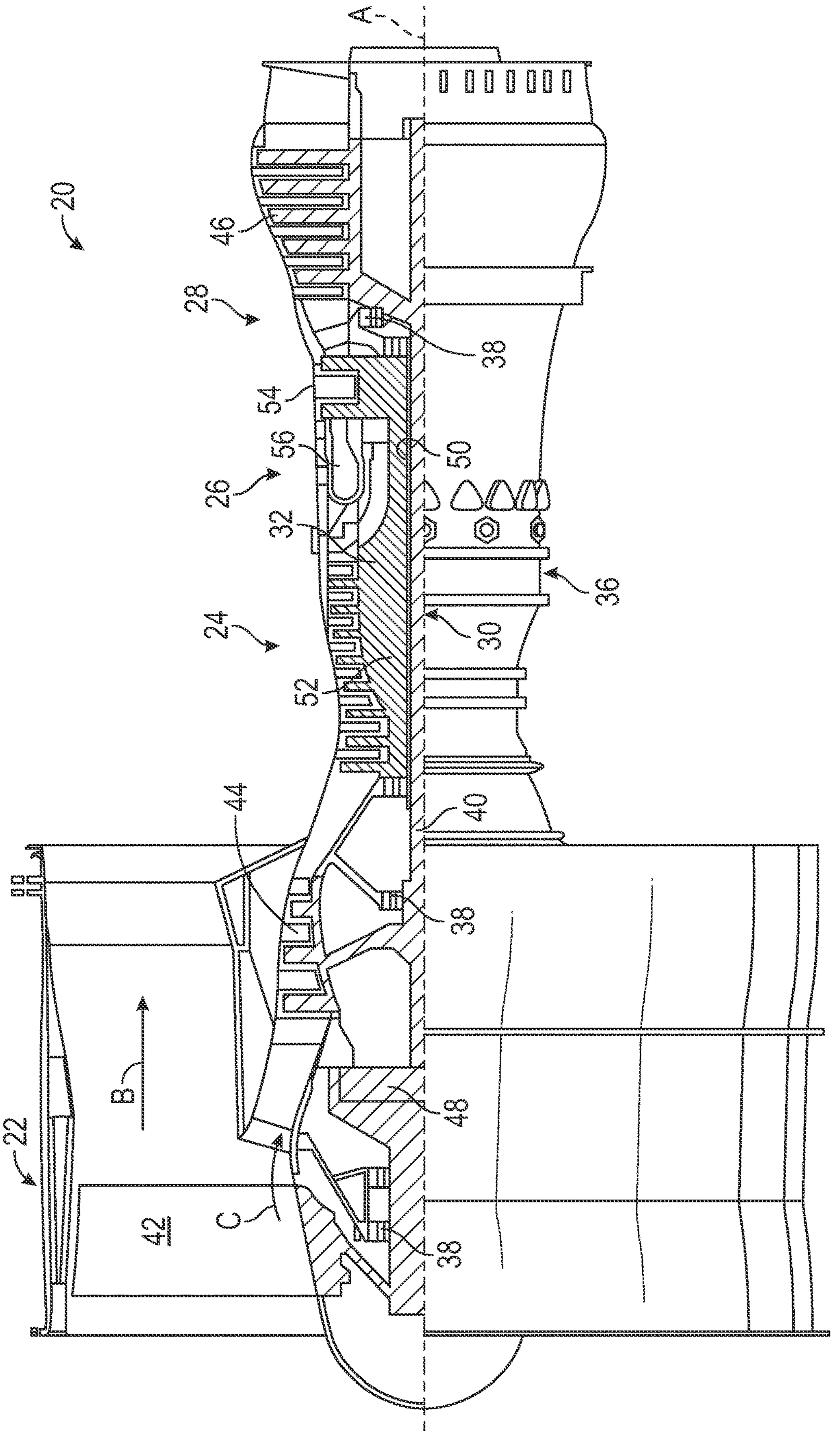
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ^{\circ}\text{R})/(518.7^{\circ}\text{R})]^{0.5}$. The "Low corrected fan tip speed" as disclosed herein according to one non-limiting embodiment is less than about 1150 ft/second (350.5 m/sec).

Figure 2:
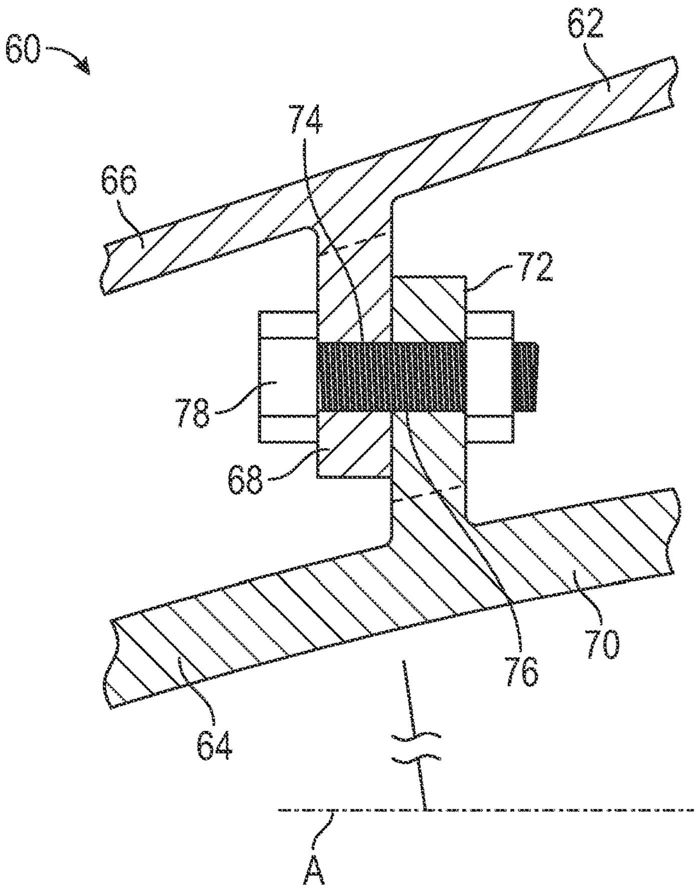
FIG. 2 is a partial cross-sectional view of an embodiment of a bolted joint of a gas turbine engine.

Referring now to FIG. 2, the gas turbine engine 20 includes a plurality of bolted joints 60 axially connecting components 62, 64 of the gas turbine engine 20, such as connecting components of the combustor 56 to components of the high pressure turbine 54. The first component 62 includes, for example, a first full hoop 66 that extends circumferentially around the engine central longitudinal axis A. A plurality of segmented first bolting features 68 extend generally radially inboard toward the engine central longitudinal axis A. The second component 64 includes a second full hoop 70 that extends circumferentially around the engine central longitudinal axis A. A plurality of segmented second bolting features 72 extend generally radially outwardly from the second fully hoop 70, away from the engine central longitudinal axis A. In some embodiments, the first full hoop 66 is disposed radially outboard of the second full hoop 70, but one skilled in the art will readily appreciate that the bolted joints 60 described herein may be applied to other arrangements of the component 62 and the component 64. The first bolting features 68 and second bolting features 72 include respective first bolt openings 74 and second bolt openings 76, through which bolts 78 are installed to secure component 64 to component 62. Given the instances of thermal mismatch between components, reduced axial stiffness at the bolted joint 60 would be desirable, but conventional approaches also reduce the load capacity in the radial direction. Therefore it is desirable to separate the axial and radial load paths of the bolted joint 60.

Figure 3:
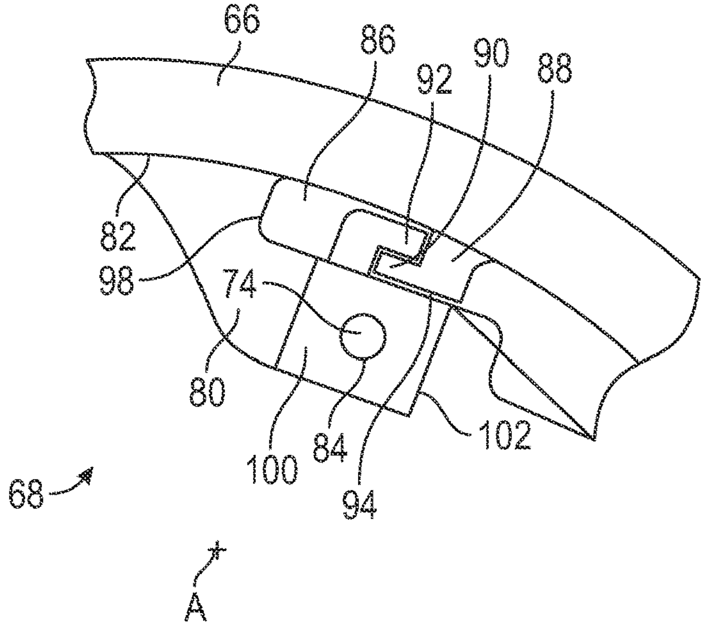
FIG. 3 is an illustration of an embodiment of a bolting feature of a bolted joint.

Referring to FIG. 3, illustrated is an embodiment of a first bolting feature 68. One skilled in the art will readily appreciate that while a first bolting feature 68 is described herein, the present disclosure may additionally or alternatively be applied to second bolting features 72. The first bolting feature 68 includes a circumferential arm 80 extending radially inwardly from the first full hoop 66 at a first circumferential location 82, and extends circumferentially such that the first bolt opening 74 is located at a second circumferential location 84, circumferentially offset from the first circumferential location 82. Further, the circumferential arm 80 defines a radial gap 86 between the circumferential arm 80 and the first full hoop 66. A bolting portion 100 including the first bolt opening 74, is disposed at an arm end 102 of the circumferential arm 80. The first bolting feature 68 further includes a connecting leg 88 extending from the first full hoop 66 toward the bolting portion 100 in a generally radial direction. While in the embodiment illustrated, the circumferential arm 80 and the connecting leg 88 are each located radially inboard of the first full hoop 66, in other embodiments the circumferential arm 80 and the connecting leg 88 may be located radially outboard of the first full hoop 66.

Figure 5:
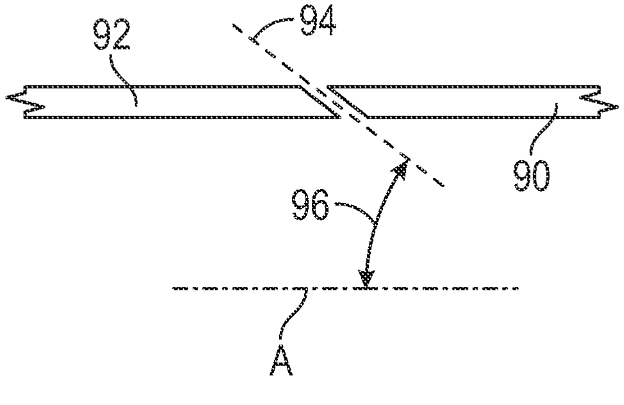
FIG. 5 is a cross-sectional view of an embodiment of a radial gap between a circumferential arm and a connecting leg of a bolting feature.

The connecting leg 88 includes a leg interlocking feature 90 that engages with a complementary arm interlocking feature 92 of the circumferential arm 80. In some embodiments, the connecting leg 88 and the circumferential arm 80 are formed as a single, unitary feature and are then separated by a manufacturing operation, such as wire electrical discharge machining (EDM) to define the leg interlocking feature 90 and the arm interlocking feature 92. In some embodiments, the EDM cuts are in a directly axial direction, while in other embodiments the EDM cuts, and thus a radial interconnect gap 94 is at a gap angle 96 relative to the engine central longitudinal axis A, as illustrated in FIG. 5. In some embodiments, the angle 96 is in the range of 5 degrees to 45 degrees. While in some embodiments the angle 96 is constant along a length of the gap 94, in other embodiments the angle 96 may vary along the length of the gap 94 to provide the desired fit and performance characteristics. In some embodiments, the inside wall 98 of the circumferential arm 80 may be formed with the same wire EDM process. In other embodiments, however, other processes such as conventional milling may be utilized to form the inside wall 98.

Figure 4:
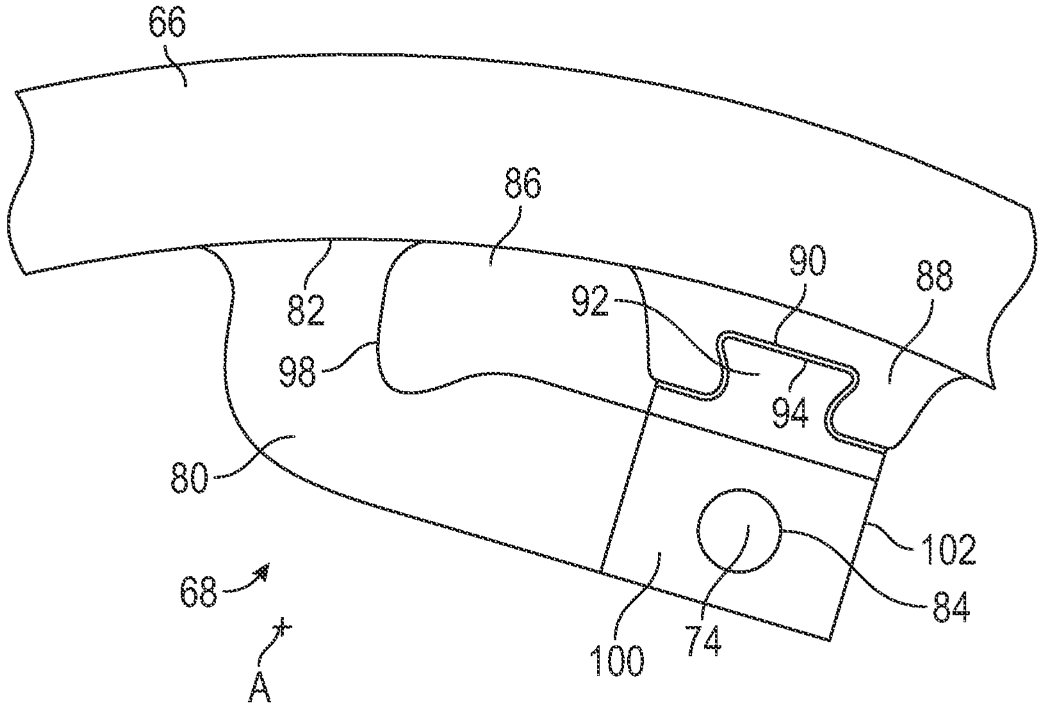
FIG. 4 is an illustration of another embodiment of a bolting feature of a bolted joint.

In the free state, the radial interconnect gap 94 is defined between the leg interlocking feature 90 and the arm interlocking feature 92. In some embodiments, such as illustrated in FIG. 3, the complementary interlocking features 90, 92 have a hook configuration. In other embodiments, such as illustrated in FIG. 4, the complementary interlocking features 90, 92 have a fir tree configuration. One skilled in the art will recognize that these configurations are merely exemplary and that other configurations, such as a dovetail configuration, may be utilized.

As stated above, in the free state the radial interconnect gap 94 is present between the leg interlocking feature 90 and the arm interlocking feature 92. During transient operation of the engine 10, such as a rapid acceleration or deceleration, relative radial motion of the first bolting features 68 and the second bolting features 72 due to, in some instances, differences in thermal response of the first component 62 and the second component 64, the radial interconnect gap 94 reduces to zero. This provides a direct radial load path from the bolting portion 84 through the connecting leg 88 and into the first full hoop 66. Meanwhile, the structure of the circumferential arm 80 and the connecting leg 88 allows the axial position of the bolting portion 100 to be largely independent. This allows the bolted joint 60 to maintain the required preload in such conditions. The contact between the interlocking features 90, 92 creates a secondary load path through the connecting leg 88, thus reducing stresses on the circumferential arm 80.

The term "about" is intended to include the degree of error associated with measurement of the particular quantity based upon the equipment available at the time of filing the application. For example, "about" can include a range of +8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A component of a gas turbine engine, comprising:

a continuous hoop portion extending at least partially around an engine central longitudinal axis of the gas turbine engine; and a bolting feature extending from the hoop portion, the bolting feature configured for securing the component to an adjacent part, the bolting feature including:

a circumferential arm extending radially and circumferentially from the hoop portion, the circumferential arm defining a radial gap between the circumferential arm and the hoop portion, the circumferential arm including a bolt opening for installation of a bolt through the circumferential arm and into the adjacent part;

a connecting leg extending radially from the hoop portion across the radial gap toward the circumferential arm; and an arm interlocking feature disposed at the circumferential arm configured to radially interlock directly with a complementary leg interlocking feature of the connecting leg, the arm interlocking feature and the leg interlocking feature having a radial interconnect gap therebetween in a free state;

wherein the leg interlocking feature is a dovetail-shaped tab installed into the arm interlocking feature defined as a complimentary dovetail-shaped slot.

2. The component of claim 1, wherein the circumferential arm is disposed radially inboard of the hoop portion.

3. The component of claim 1, wherein the circumferential arm includes an arm base connecting to the hoop portion and a bolting portion including the bolt opening, wherein the arm base is disposed at a first circumferential location and the bolt opening is disposed at a second circumferential location different from the first circumferential location.

4. The component of claim 3, wherein the arm interlocking feature is disposed at the bolting portion.

5. The component of claim 1, wherein the radial interconnect gap is formed by electrical discharge machining.

6. The component of claim 1, wherein the radial interconnect gap is at a non-zero angle relative to the engine central longitudinal axis.

7. A bolted joint assembly of a gas turbine engine, comprising:

a first component extending at least partially around an engine central longitudinal axis;

a second component extending at least partially around the engine central longitudinal axis; and a plurality of bolts connecting the first component to the second component;

wherein the first component includes:

a continuous hoop portion extending at least partially around the engine central longitudinal axis; and a bolting feature extending from the hoop portion, the bolting feature configured for securing the first component to the second component, the bolting feature including:

a circumferential arm extending radially and circumferentially from the hoop portion, the circumferential arm defining a radial gap between the circumferential arm and the hoop portion, the circumferential arm including a bolt opening for installation of a bolt of the plurality of bolts through the circumferential arm and into the second component;

a connecting leg extending radially from the hoop portion across the radial gap toward the circumferential arm; and an arm interlocking feature disposed at the circumferential arm configured to radially interlock directly with a complementary leg interlocking feature of the connecting leg, the arm interlocking feature and the leg interlocking feature having a radial interconnect gap therebetween in a free state;

wherein the leg interlocking feature is a dovetail-shaped tab installed into the arm interlocking feature defined as a complimentary dovetail-shaped slot.

8. The bolted joint assembly of claim 7, wherein the circumferential arm is disposed radially inboard of the hoop portion.

9. The bolted joint assembly of claim 7, wherein the circumferential arm includes an arm base connecting to the hoop portion and a bolting portion including the bolt opening, wherein the arm base is disposed at a first circumferential location and the bolt opening is disposed at a second circumferential location different from the first circumferential location.

10. The bolted joint assembly of claim 9, wherein the arm interlocking feature is disposed at the bolting portion.

11. The bolted joint assembly of claim 7, wherein the radial interconnect gap is formed by electrical discharge machining.

12. The bolted joint assembly of claim 7, wherein the radial interconnect gap is at a non-zero angle relative to the engine central longitudinal axis.

13. A gas turbine engine, comprising:

a combustor;

a turbine section; and a bolted joint assembly securing the combustor to the turbine section, the bolted joint assembly including:

a first component of the combustor extending at least partially around an engine central longitudinal axis;

a second component of the turbine section extending at least partially around the engine central longitudinal axis; and a plurality of bolts connecting the first component to the second component;

wherein at least one of the first component or the second component includes:

a continuous hoop portion extending at least partially around the engine central longitudinal axis; and a bolting feature extending from the hoop portion, the bolting feature configured for securing the first component to the second component, the bolting feature including:

a circumferential arm extending radially and circumferentially from the hoop portion, the circumferential arm defining a radial gap between the circumferential arm and the hoop portion, the circumferential arm including a bolt opening for installation of a bolt of the plurality of bolts through the circumferential arm and into the second component;

a connecting leg extending radially from the hoop portion across the radial gap toward the circumferential arm; and an arm interlocking feature disposed at the circumferential arm configured to radially interlock directly with a complementary leg interlocking feature of the connecting leg, the arm interlocking feature and the leg interlocking feature having a radial interconnect gap therebetween in a free state;

wherein the leg interlocking feature is a dovetail-shaped tab installed into the arm interlocking feature defined as a complimentary dovetail-shaped slot.

14. The gas turbine engine of claim 13, wherein the circumferential arm is disposed radially inboard of the hoop portion.

15. The gas turbine engine of claim 13, wherein the circumferential arm includes an arm base connecting to the hoop portion and a bolting portion including the bolt opening, wherein the arm base is disposed at a first circumferential location and the bolt opening is disposed at a second circumferential location different from the first circumferential location.

16. The gas turbine engine of claim 15, wherein the arm interlocking feature is disposed at the bolting portion.

17. The gas turbine engine of claim 13, wherein the radial interconnect gap is at a non-zero angle relative to the engine central longitudinal axis.

* * * * *